April 23, 1968     A. FIRTH ETAL     3,379,081

CUTTING APPARATUS WITH WORK FEED

Filed May 19, 1966     3 Sheets-Sheet 3

3,379,081
CUTTING APPARATUS WITH WORK FEED
Alan Firth and Lawrence Mawbey, Leicester, England, assignors to United Shoe Machinery Corporation, Flemington, N.J., and Boston, Mass., a corporation of New Jersey
Filed May 19, 1966, Ser. No. 551,427
Claims priority, application Great Britain, May 29, 1965, 22,928/65
3 Claims. (Cl. 83—422)

The present invention relates to improvements in cutting apparatus and more particularly to improvements in apparatus for feeding a lay comprising a plurality of plies of sheet material to a cutting press. The invention is illustrated herein as applied to a pillar press of the type shown in United States Patent D198,995, but it will be understood that the invention is not limited to use with presses of said type.

One method of cutting a lay comprising a plurality of plies of sheet material which has been proposed has entailed forming the lay on a work surface, drawing the lay off the surface onto an upturned cutting die and feeding the die and the lay thereon through a cutting press. In carrying out this method there has been a tendency for the lay to be disturbed as it is drawn off the work surface and for creasing of the plies to take place.

It is one of the various objects of the present invention to provide an apparatus adapted for use in feeding such a lay to a cutting press in which apparatus disturbance of the lay during feeding will be minimized.

To this end and in accordance with a feature of the present invention, there is provided, in cutting apparatus comprising a press having a cutting bed and a beam movable vertically toward and away therefrom, a work support providing a laying up table, said support having an edge spaced horizontally from the cutting bed, a conveyor comprising a conveyor member mounted for movement underneath the work support for movement past said edge and toward said bed for carrying a cutting die in edge-up orientation into the press, and means operative at a location between said edge and said bed for pressing a lay against a cutting die on the conveyor for assisting the feeding of the lay from the laying up work support onto the die and the feeding of the lay and die into the press. In the illustrative embodiment of the invention, the feeding device comprises a roller extending transversely of the conveyor which roller in accordance with a feature of the invention is arranged to be driven at a peripheral speed equal to the linear speed of the die on the conveyor. Preferably the driven roller has a resilient periphery and by so engaging the upper surface of the lay in driving relation promotes the feeding of the lay superimposed on the cutting die into the press with a minimum of disturbance thereto.

Other features and advantages of the invention will best be understood from the following description taken together with the accompanying drawings in which.

Figure 1:
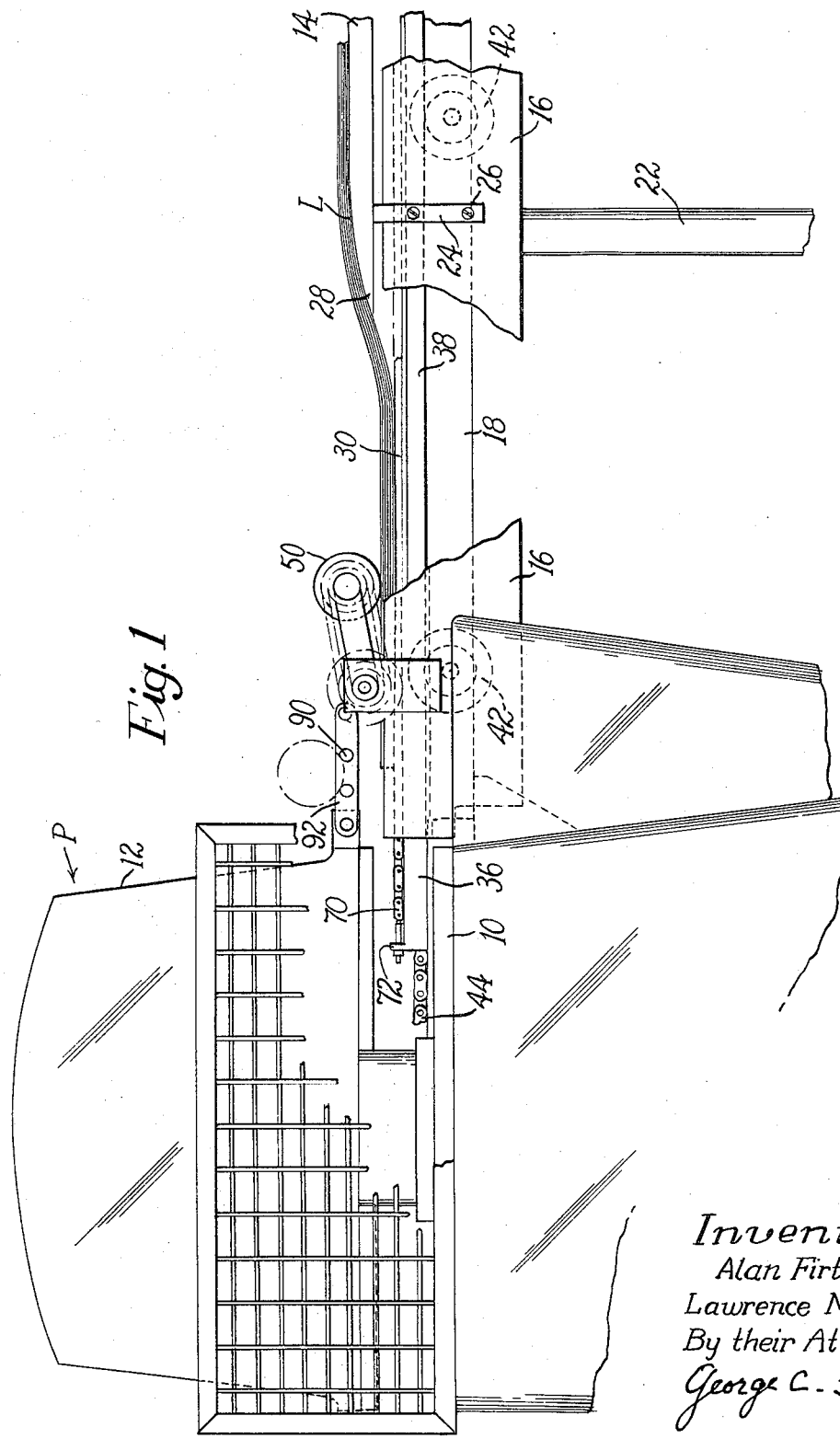
FIG. 1 is a side elevation of apparatus embodying the present invention with parts broken away better to show features thereof.

Referring now to the drawings, FIG. 1 shows a cutting press P provided in accordance with the present invention with means for feeding thereto a die and a lay L comprising a plurality of plies of material to be cut. The press has a cutting bed 10 and a beam 12 movable vertically toward and away from the bed 10.

The feeding device of the present invention comprises a work support 14 and a conveyor 16 supported on a frame 18 side members 20 of which extend the length of the conveyor. The support for the frame 18 comprises a post 22 while the forward end of the frame is supported by the frame of the press P.

The work support 14 is rectangular in plan and is supported from the side members by brackets 24 one of which is shown in FIG. 1, the brackets being secured to the members 20 by screws 26. The support 14 has an edge 28 spaced horizontally from the cutting bed 10, the edge portion of the support being suitably chamfered to accommodate a lay being led off the support.

The conveyor 16 is arranged to carry a die beneath the work support 14 and into the press with the lay L superposed thereon. The die will usually, but not necessarily, be a multiple cavity die comprising a plurality of steel rule elements 30 supported in a matrix 32 of plywood. The matrix is supported in its movement on the conveyor by a plurality of rolls 34 mounted in the frame 18 and is arranged to be conveyed by a conveying member 36. The member 36 is a frame-like pallet comprising side members 38 and 40 between which the matrix 32 is received, rolls 42 supporting the member 36 for movement along the conveyor. A chain 44 extending from one end of the conveying member 36 through the press to the other end of the conveying member is connected to driving means (not shown) operable to move the conveying member underneath the work support 14 past the edge 28 and toward the press P.

Means for pressing a lay L against a die such as the illustrative steel rule elements 30 at a location between the work support 14 and the cutting bed 10 to assist the feeding of the lay comprises a roller 50 extending transversely across the conveyor 16.

Figure 2:
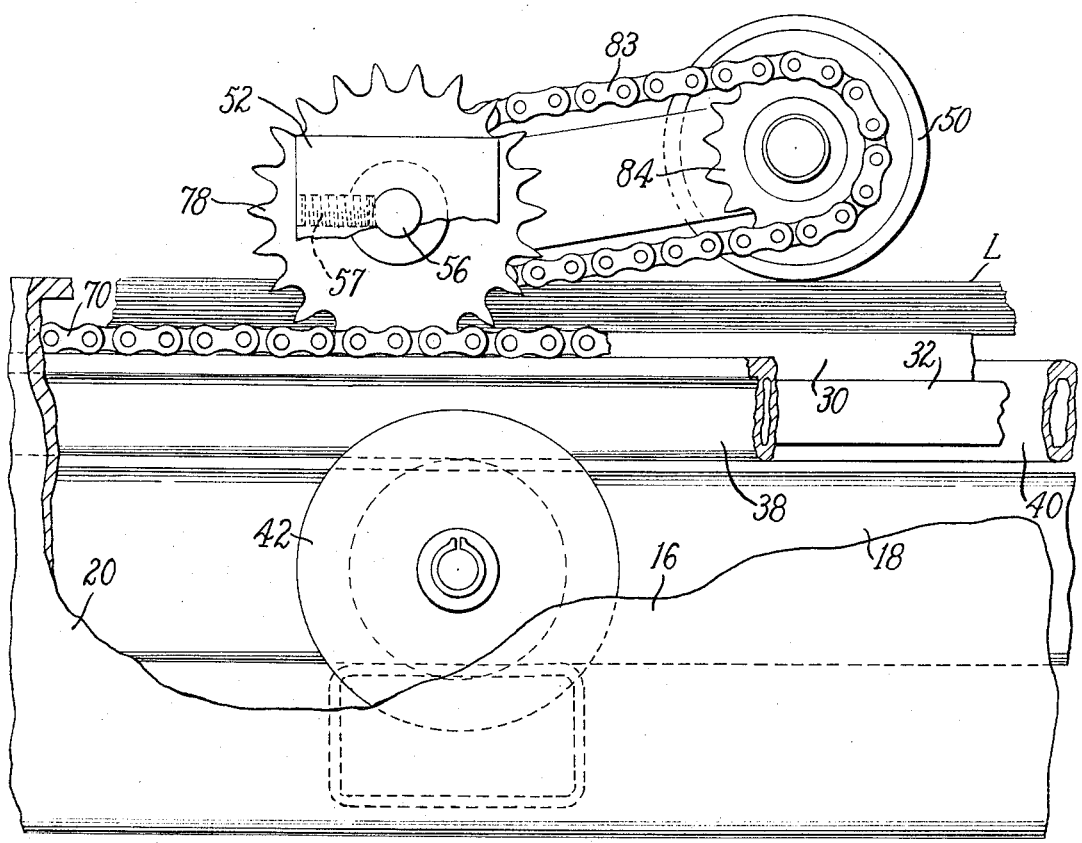
FIG. 2 is a view on an enlarged scale of a portion of the apparatus shown in FIG. 1.
Figure 3:
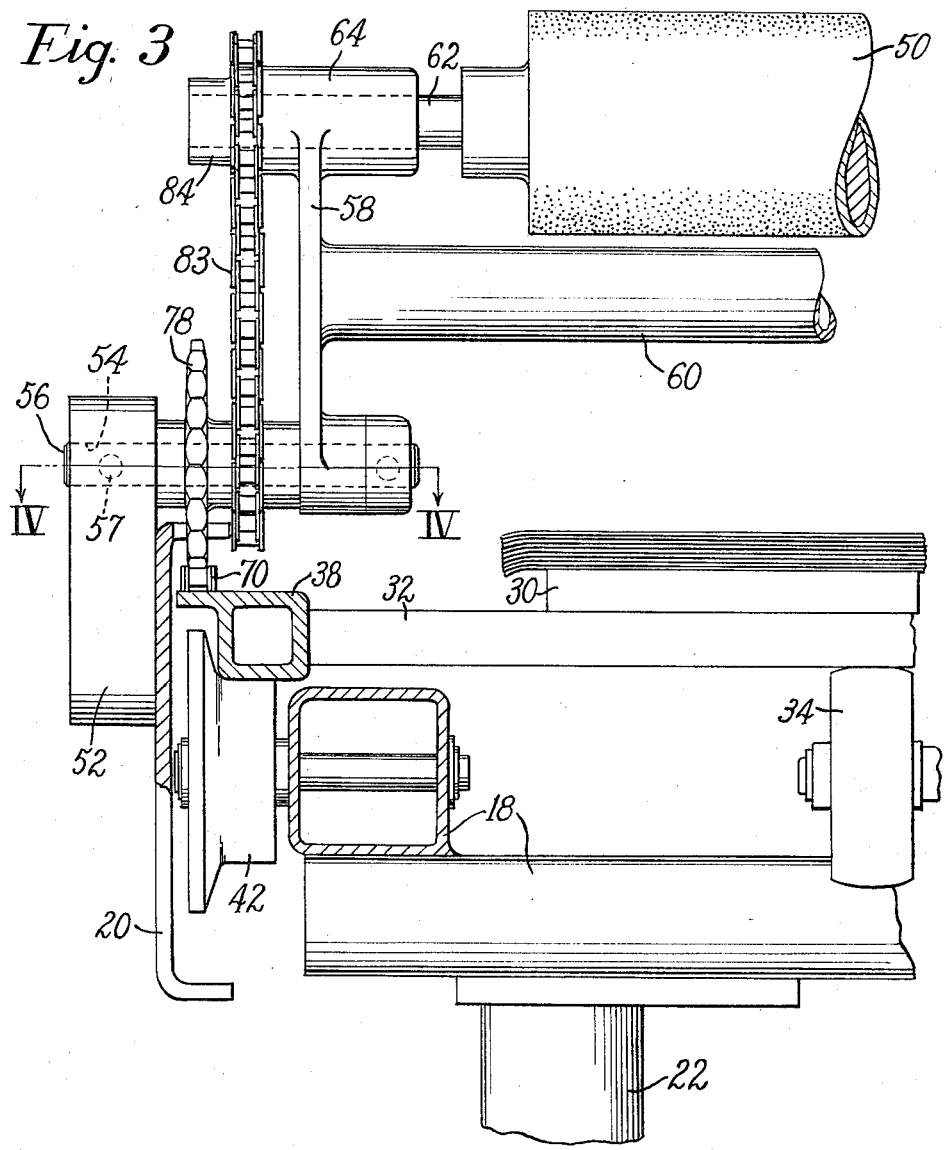
FIG. 3 is a view on the same scale of parts shown in FIG. 2 looking from right to left of said figure.
Figure 4:
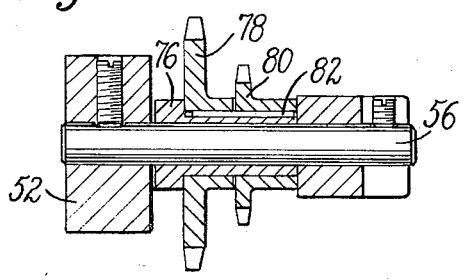
FIG. 4 is a section taken on line IV—IV of FIG. 3.
Figure 5:
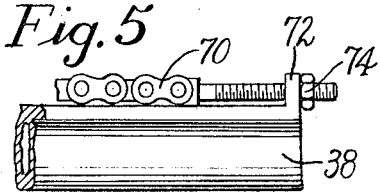
FIG. 5 is a side elevation on an enlarged scale of a portion of apparatus as shown in FIG. 1.

Means for supporting the roller 50 comprise corresponding pairs of elements at opposite sides of the conveyor and only those elements of one side will be described in detail. Accordingly, a support bracket 52 mounted on the side member 20 is provided with a horizontal aperture 54 in which a shaft 56 is fixedly mounted by a set screw 57 (FIG. 2). A bracket 58 receiving one end of the roller 50 and journaled on the shaft 56 is rigidly connected by a cross member 60 to a corresponding similarly mounted bracket receiving the other end of the roller on the other side of the conveyor, the end portions 62 of the roller being journaled in enlarged end portions 64 of the brackets. Thus the roller 50 is supported for bodily movement in a radial path about the axis of the shafts 56 between a first position shown in FIG. 1 in which it is adapted to engage the upper surface of a lay L superimposed upon a cutting die and a second position indicated in FIG. 1 by a dot-dash circle in which the roller is removed from the first position to a location further spaced from the edge 28 whereby it is out of the way of an operator in initially disposing a lay on a die on the conveyor.

Suitably the roller 50 is provided with a resilient peripheral surface and is arranged to be driven at a peripheral speed corresponding to the linear speed of the conveyor. To this end the conveying member 36 is provided with a horizontal chain 70, the chain being mounted between lugs 72 of the side member 38, fittings at the ends of the chain threadedly engaging the lugs and being secured by lock nuts 74. On a bearing 76 rotatably carried on the shaft 56 is fixedly mounted a sprocket 78 engaging the chain 70. The sprocket 78 is connected to a second sprocket 80 by a key 82 while an endless chain 83 connects the second sprocket with a third sprocket 84 fixedly carried on the end portion 62 of the roller 50. The sprockets are dimensioned in relation to the diameter of the roller 50 so that as the conveyor member is moved along the conveyor with the chain 70 in driving engagement with the sprocket 78 the roller is driven at a peripheral speed corresponding to the linear speed of the conveyor member.

In operation, the operator finds the apparatus with the roller 50 disposed away from its operative disposition, suitably being carried on rods 90 extending widthwise of the conveyor and mounted in brackets 92 secured to the beam 12 of the press. A lay L is formed on the surface of the work support 14 and is led over the edge 28 of the support onto the upwardly facing edges of the die elements 30. The roller 50 is then swung bodily to its operative position in engagement with the upper surface of the lay and by operation of the driving means, the conveying member 36 is moved toward the press. During such movement, the lay is gripped between the cutting elements 30 and the periphery of the roller 50, both surfaces of the lay being thus pressed and propelled forward toward the press whereby the lay L is drawn from the work support with a minimum of disturbance. The lay L and the conveying member 36 may then be fed step-by-step through the press P the beam 12 of which operates on successive portions of the lay to cut them until the entire length of the cutting area has been treated.

Having thus described our invention what we claim as new and desire to secure by Letters Patent of the United States is:

1. In cutting apparatus comprising a press having a cutting bed and a beam arranged for relative movement for pressing cutting dies through workpieces, in combination therewith:

a work support providing a laying up table for forming a lay comprising a plurality of plies of material, said support having an edge spaced horizontally from said cutting bed, a conveyor comprising a conveyor member mounted for movement underneath the work support past said edge and toward said bed for carrying a cutting die in edge-up orientation with said lay superimposed thereon into said press, a roller extending transversely across said conveyor between said edge of the work support and the cutting bed, said roller being mounted for vertical bodily movement to engage the upper surface of a lay superimposed on a cutting die disposed on said conveyor, and means for rotating said roller during such engagement at a peripheral speed equal to the linear speed of the lay on the conveying member for assisting in feeding said lay.

2. Apparatus as in claim 1 wherein said roller has a resilient periphery.

3. Apparatus as in claim 1 in which said roller is mounted for bodily swinging movement about an axis parallel to the axis of the roller between a first position in which it is adapted to engage a lay carried in superimposed relation with a cutting die on said conveyor and a second position further removed from said edge whereby superimposition of a lay on a die on the conveyor is facilitated.

References Cited
UNITED STATES PATENTS

| | | | |
|---|---|---|---|
| 398,341 | 2/1889 | Morgan | 83—532 |
| 847,536 | 3/1907 | Zimmerman | 83—533 X |

ANDREW R. JUHASZ, *Primary Examiner.*